Patented June 1, 1948

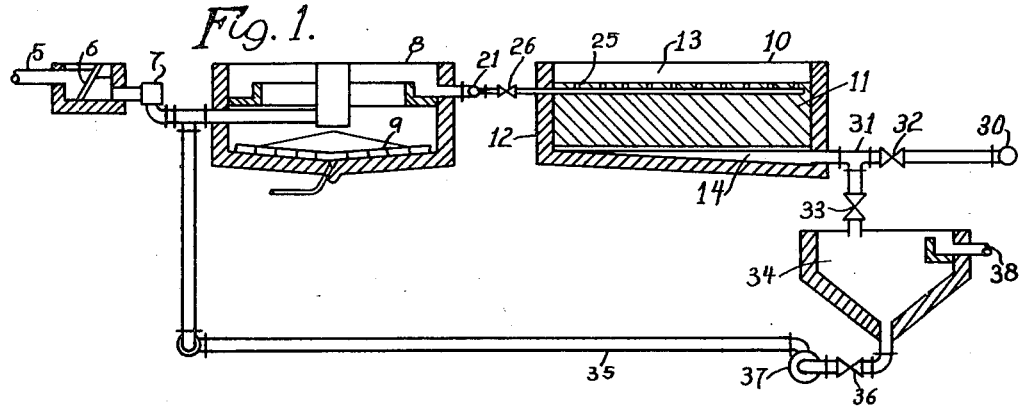
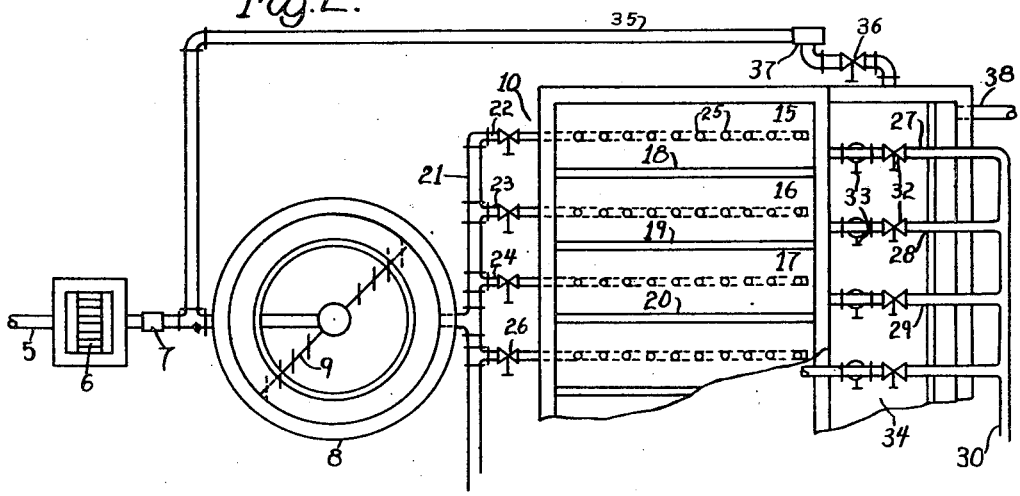

2,442,432

UNITED STATES PATENT OFFICE 2,442,432

SEWAGE TREATMENT

Frank D. Prager, Chicago, Ill., assignor to Graver Tank & Mfg. Co., Inc., a corporation of Delaware Application August 22, 1942, Serial No. 455,971

2 Claims. (Cl. 210—7)

This invention relates to a method and apparatus for sewage treatment, particularly to a trickling filter.

It is an object of my invention to provide a controlled filter and a system of controlled filtration.

Another object is to provide increased detention of sewage in a trickling filter.

Another object is to provide a system of sewage filtration with preventive rinsing.

Another object is to provide a trickling filter which may be dosed with sewage at intermediate rates, between those of the low and high rate filters known to the art, and which reduces impurities with an efficiency comparable to that of the low rate filters and improved over that of the high rate filters.

Another object is to provide, in a trickling filter, a biological growth comprising aerobic and facultative aerobic or anaerobic bacteria, to allow said growth to develop abundantly under a relatively quiescent, continuous flow of sewage, and to provide more rapid, rinsing flows in a controlled cycle over local areas of the filter so as to correct natural tendencies towards excessive accumulation of secretions and other products of said growth.

Still other objects are, to provide a filter wherein successive areas can be rinsed in the manner aforesaid, to provide suitable equipment for the same, to determine and conduct the operating cycle to best advantage, and generally to provide steps and means for sewage control and distribution whereby proper conditions can be secured for the most efficient biological growth in the several parts of the filter.

Additional objects may appear from the following disclosure.

In the drawings:

Figure 1 is a sectional elevation of apparatus embodying my invention.

Figure 2 is a plan view of the apparatus shown in Figure 1.

The main outfall sewer 5 of the municipality or institution, the sewage of which has to be purified, has a coarse screen 6 and a flow meter 7 interposed thereon, in the inlet portion of the sewage treatment plant. The sewage which has passed through these devices is discharged into a primary clarifier 8 equipped with a slow-moving, continuous sludge removal device 9. In this tank, the sewage is rendered relatively clear. Furthermore, any tendency towards septic decomposition of the sewage, or concurrent anaerobic and aerobic digestion, of the organic material dissolved and distributed in the sewage, is eliminated or at least reduced by the removal of the relatively coarse, solid sludge, in which the anaerobic form of microbes dominates. However, tremendous numbers of microbes in either form remain in every cubic inch of the sewage.

The trickling filter 10, which receives the clarified sewage, has a filter body 11 composed of stones in form of crushed rocks, preformed blocks, or the like. The filter is confined by a wall 12, with a sewage distributing system 13 above the filter body and an underdrain 14 below the same. The distributing system 13 receives the material to be filtered and distributes the same over the filter body. The filtered sewage is collected by the underdrain 14 to be discharged to a floating stream or to any other suitable place of further purification, disposal or use. The underdrain 14 also serves to promote the necessary circulation of air through the filter body.

The filter 10 as shown is rectangular. It consists of a series of sections or subdivisions 15, 16, 17, etc., separated from one another by partitions 18, 19, 20, etc. The distributing system 13 comprises a main inlet header pipe 21, and lateral manifold pipes 22, 23, 24, etc., branching off from the header 21 and entering the filter sections 15, 16, 17, etc., respectively. Sewage distributing nozzles 25 are connected to the manifold laterals 22, 23, 24, etc., and discharge sewage upon the filter body. The rate of flow of sewage into the laterals 22, 23, 24, etc., can be proportioned or modified by variable rate of flow control valves or pipe throttling means 26 which are interposed thereon, preferably outside of the filter wall 12. These valves may be either hand-operated or equipped with automatic operating means. Their purpose and operating cycle will become obvious upon consideration of the process hereinafter proposed.

The underdrains 14, as well as the bodies 11 of the several filter sections 15, 16, 17, etc., are partitioned by the aforementioned walls 18, 19, 20, etc., and each sectional underdrain is individually drained by a pipe 27, 28, 29, etc. These drain pipes may be joined to a drain header 30 leading to the aforementioned point or points of destination of the filtered sewage. Each individual drain pipe 27, 28, 29, etc., has interposed thereon the arms of a T 31 and a shut-off valve 32 between the T and the drain header 30. The leg of the T has a shut-off valve 33 connected thereto. When this latter valve is open, filtered sewage flows into a tank 34, which may be in common to several filter sections 15, 16, 17, etc. This tank in turn can be drained by a drain pipe 35 controlled by a shut-off valve 36. The pipe 35, as shown, leads back to the influent end of the plant, ahead of the clarifier 8, by means of a small recirculating pump 37; or instead of leading to the influent end, the pipe 35 might terminate at any other suitable point ahead of the filter 10 or even at the river or point of final disposal. The tank 34 may also have an overflow launder 38, drained in any suitable manner.

During the starting and ripening period, the operation of the filter 10 may be substantially that which is usual in apparatus known to the art, of the low rate type. Incident to such initial operation, there is developed on the stones of the filter body 11 a biological growth which is substantially composed of aerobic bacteria, facultative aerobic and anaerobic bacteria, algae, and fungi. This growth of microorganisms is also populated by protozoa, worms, larvae, and other relatively higher organisms. This organic growth produces certain amounts of enzymes, zoogloeal gel, secretions of the higher organisms, dead cell structures, and so on. The resulting mass forms a gelatinous coat or film on the solid surfaces of the filter stones.

As the sewage trickles down over this gelatinous film, it is repeatedly absorbed, held for certain periods, and then discharged in relatively purified condition, due to the adsorptive, oxidizing, flocculating and other properties of the bacteria and enzymes in the film. When the sewage finally reaches the filter underdrain, it has been purified to a high extent.

A number of conditions are required to maintain and intensify said purifying properties of the bacterial film. Primarily the active biological growth or substances must not be removed, except by controlled action to be explained hereinafter. The living organisms must be supplied with food. This is generally contained in the sewage. They also must be supplied with atmospheric oxygen for their respiration, and freed of the carbon dioxide exhaled. For this purpose, air is caused to circulate through the filter body, as mentioned. Finally, the biological growth and its environment must be conditioned in a number of other ways, comprising, among other things, maintenance of proper temperatures, pH, non-toxic sewage, and so on. The filter must be constructed and operated so as to provide these various conditions in the best manner known and available.

If this is done in accordance with practices established in the operation of low rate filters, it is possible continuously to apply sewage at a rate of about 1 to 4 million gallons per acre per day (MGAD). The biological oxygen demand (BOD) of a clarified sewage having ordinary composition and strength will then be reduced by about 85 to 95 per cent, depending on the precise nature of the impurities responsible for the BOD, the actual rate and manner of dosage, the degree of perfection with which the required temperature, aeration, and other conditions are provided, and possibly other factors.

It has been a general doctrine and practice, from the inception of trickling filters to date, that ordinary clarified sewage must not be continuously applied on a trickling filter at a rate such as about 5 to 15 MGAD, because such application, and especially the rates of about 7 to 10 MGAD, are likely to lead to operating difficulties. Apparently, the biological film and particularly the enzymes and zoogloea thereof grow too rapidly or prolifically at such a rate, and the filter becomes clogged, with the result that surface ponds of sewage appear, which finally overflow untreated. It is known, however, that the reduction of BOD in the sewage actually filtered is very good at such rates, and it is only due to the danger of clogging and ponding that it has been thought that such rates must be avoided.

It is also known that sewage can be continuously applied on a filter at rates between about 15 and 30 MGAD, or when treating a very dilute sewage or using recirculation of filtrate, then at total rates as high as 50 or 100 MGAD, of which about 15 to 30 MGAD represents the flow of normal raw sewage. This can be done without danger of clogging and ponding, and with a relatively fair degree of BOD reduction, that is, about 60 to 70 per cent. It seems that upon such high rate application of the sewage, any excessive growth of gel is continuously flushed out of the filter body, but a fair amount of active organisms remain, and are regenerated by bacterial multiplication, aided by the plentiful supply of food in the rapid sewage flow.

It is known that in regions of excessive accumulation of gel, the bacterial growth turns anaerobic and that the control of excessive accumulations by rapid flows tends to maintain a prevalence of aerobic conditions. It has been assumed that a continuous prevalence of aerobic conditions is required for rapid and economical operation of a trickling filter. This, however, is contradicted by the aforementioned experience that low-rate filters, at loading rates conducive to ponding, show a high and desirable activity upon the sewage which is still capable of trickling through the filter.

Halvorson and Smith, in their Patent 2,141,979 have stated the theory that high rate dosage of a trickling filter is successful only if the momentary distribution ratio is sufficiently low, that is, if the distribution is as uniform at all moments as may be feasible. In the same patent, they also state that it is important to maintain aerobic conditions, by flushing the filter. These two requirements of a low momentary distribution ratio and aerobic filter conditions, have been widely accepted. However, they are in conflict with one another. The question arises to what extent either of the two features is really required.

I have found that it is generally more important to provide a high degree of some beneficial bacterial activity than to maintain any particular proportion, either high or low, between the aerobic and anaerobic forms of bacterial life. Changes in degree of uniformity of dosage are neither particularly bad nor good, so long as extremely high momentary dosage is avoided.

Of course, the anaerobic form of life tend to gain preponderance in the deepest portions of a bacterial film, when the film has grown so deep as to hinder the ready access of atmospheric oxygen, by diffusion, to said deepest layers, close to the filter stone. Due to the development of anaerobic and septic layers, any previous relative preponderance of bacteria in aerobic form tends to disappear. It has been said that the trickling filter, when in such condition, carries part of the load normally assigned to subsequent anaerobic sludge digesters. This is true, but it is also true that the filter, in such condition, is highly effective to perform its proper work of BOD reduction by aerobic bacterial purification.

The surprisingly high degree of BOD reduction in a filter which is about to clog has several reasons. One reason is that substantial parts of the aerobic work are performed at the gel-sewage interface, not in the deeper strata of the film. Another reason is that it is better to have, in every milliliter of the film, a billion of aerobic bacteria and two billion anaerobic bacteria, than only a fraction of a billion of aerobic bacteria and no anaerobic ones. This is true at least so long as the aerobic bacteria, or generally the bacteria which are active in sewage purification, have proper living conditions, so that they can perform their work. This in turn requires mainly that the mechanical clogging of the filter by zoogloea, secretions, or other wastes is avoided. Still another reason is that a deep and abundant growth of micro-organisms, enzymes, etc., causes greater absorption of sewage, allowing longer detention thereof in the filter. It is difficult to measure the precise detention time of the sewage in any trickling filter; however, this time can be approximately determined, and it is now assumed in the art that the actual detention time in standard low-rate filters is of the order of ten to fifteen minutes.

I build up the films so as to provide much longer detention periods, such as about thirty to forty-five minutes. At the same time I apply sewage at any rates between about 1 and 15 MGAD, but preferably between about 5 and 15 MGAD, on my filter body 10. As a result, at least 95 per cent of the BOD is generally removed, especially at the higher rates, so long as the operating instructions hereinafter outlined are complied with. The filter is constantly maintained in a condition of abundant, almost self-clogging life, actual clogging being prevented by periodic, preventive rinsing flows.

It is plain at 15 MGAD with 95 per cent BOD removal is preferable over 23 MGAD with 60 per cent BOD removal. Furthermore, operation in accordance with this invention is frequently preferable even over high rate dosage at 30 MGAD, or more. Such high rate operation, in order to lead to fair reduction of BOD, requires a recirculation of sewage, with a total flow such as 50 or 60 MGAD, which is expensive. Finally, a BOD removal of 60 per cent or even 80 per cent is frequently insufficient; and it may be uneconomical to provide the additional treatment units that would be required.

In order to prevent the clogging of the filter 10 running at a rate between 5 and 15 MGAD, I operate the valves 26 so as to provide periodic discharges of sewage on top of local filter areas at high momentary rates such as 50 or 100 or 500 MGAD or more, for short periods of time. Such flushing or rinsing flows removes excess zoogloea and, of course, most of the larvae and other micro-organisms. Incidentally, such rinsing flows also tend to establish aerobic conditions in the bacterial beds; but too much of the growth must not be removed, no matter whether the filter will be brought to the point of extreme aerobic condition or not. Accordingly, such high rate flows are applied rarely and briefly.

In some instances, the preventive rinse may be effected with other liquids than the sewage itself, for instance, water, recycled contents of the tank 34, or the like.

During dosage at such extreme rates, as 50 to 500 MGAD, no satisfactory purification of the sewage used for the same can be expected. This sewage effluent, which enters through the valve 33 into the tank 34, is preferably settled in this tank, for reasons to be explained presently. Sewage and sediment from the tank 34 is then removed from the tank, in a few minutes, and recirculated through the drain 35; or it can be diluted with a better effluent of the other filter beds, and slowly discharged to waste.

Between the rinsing flows at extremely high rates, the sewage is applied at daily average rates between about 5 and 15 MGAD on each section of the filter. This normal flow of sewage is discharged to the river through the valves 32 when it has been purified in the filter.

This manner of operation prevents clogging, maintains an abundant filter flora, and allows the self-regeneration thereof after each rinsing step. The facultative aerobic and anaerobic bacteria facilitate the transition from relatively aerobic conditions in a filter section, after each rinse, to more anaerobic conditions. Simultaneously, bacteria in each form will multiply, resulting in a high degree of purification.

The necessary control of the rinsing cycles, to counteract clogging tendencies while avoiding an excessive loss of bacterial films, must be conducted in an empirical manner. The actual amount of filter gel removed from each filter section can be readily observed by operating the tank 34 as an intermittent settler, that is, by allowing the solids to settle quietly, after the rapid inflow through the valve 33. The observed amount of gel removed allows an estimate of the proportion of bacteria removed. Furthermore, the condition of the removed gel can be analyzed.

As soon as the particular characteristics of the individual filter 10 and of the sewage treated have been learned, it will be possible to decide on a local standard cycle of operation. Thereafter, close observation of the tank 34 and its contents will make it possible to provide necessary seasonal and other adjustments in this standard cycle. In this connection, it will be remembered that trickling filters have certain seasonal periods in which they tend to discharge more or less of the bacterial films. A relatively uniform cycle of periodical discharges can be provided in accordance herewith.

The filter flora built up and maintained as part of the filter bed, in accordance herewith, differs from that of the low rate filters known to the art in that it is allowed to develop more abundantly, by the more favorable conditions as explained. Pursuant to each downward rinse, this flora is partly reduced to smaller proportions, but this is done only locally and temporarily, and the reduced portions of the filter growth are promptly regenerated by being exposed to said favorable conditions again.

My filter flora differs even more profoundly from that of the high rate filters known to the art, which is constantly kept at a point of near-starvation.

While the precise composition, dimensions and other properties of my filter flora cannot be stated in more detail than has been provided above, it can be said that this flora or growth has such depth or thickness, in the average, as to provide a total detention time of about 30 or 45 minutes for the sewage passing through the same, at a flow rate of about 10 MGAD. On the other hand, it can be said that this growth has no such depth or thickness at any time as to actually obstruct or clog the interstices between the filter stones; it allows trickling flows of the sewage, from the film on each stone to the next lower one, and it also allows circulation of air.

Heretofore, attempts have been made to recondition standard low-rate trickling filters by downward rinsing. However, I believe that I am the first to provide a definite, controlled, and relatively uniform cycle of preventive rinsing steps, which can be incorporated in the flow of an actual system, as discharged from the typical municipality or institution and which allows operation at rates between 5 and 15 MGAD. Heretofore, the most that could be done was to operate a filter at a low rate such as 5 or 6 MGAD until it broke down; then to interrupt normal operation altogether; to discharge the whole sewage untreated; to flush the filter completely; to restart it over an extended period, and then to resume operation. Attempts have also been made to backwash trickling filters upwardly. These have had similar limitations, and have required special and expensive constructions of filter underdrains and other instrumentalities.

Attention is directed to the fact that final sedimentation tanks are not required for the normal filter effluent of a sewage disposal plant according to this invention. The normal filter growth, as mentioned, carries a considerable part of the load otherwise assigned to the anaerobic sludge digesters. For this reason, the flocculated solids or humus contained in my normal filter effluent is relatively well stabilized. Furthermore, the amount of solids or humus in my normal filter effluent is very small, due to the controlled cycle of discharges received in the settler 34. This latter settler, which serves only a part of the filters at any time, and operates intermittently, can be much smaller than the normal secondary tank. In some cases, it may be possible to eliminate even this small tank 34.

The only special equipment needed for operation in accordance with my invention is the system of piping and valves adapted to carry each of the different flows contemplated. The rinsing flows may be about five or ten or twenty times larger than the normal flows. This, of course, introduces certain hydraulic problems not heretofore met in trickling filters; however, such problems are easy to solve by analogy to the rapid filter used for the mechanical purification of water, in which the rates of operation and wash, as presently applied, ordinarily are about 125 MGAD and 2000 MGAD respectively, and both flows are carried by the same system of underdrain piping, and sometimes, by the same valves.

*Example*

The whole of the sewage of a municipality or institution, after pretreatment by coarse screens 6 and primary clarifiers 8, is received in the main header 21. The average flow amounts to 1 million gallons per day (MGD), with a maximum flow of 2 MGD. There are 10 filter sections 15, 16, 17, etc., each of which provides a filter area of 10 ft. width and 35 ft. length. Accordingly, the normal dosage of the filter as a whole is about 12 MGAD. During the daily periods of low and average flows, the sewage is equally distributed over the 10 filter sections, by proper setting of the valves 26. The valves 32 are open and the valves 33 and 36 are closed. The daily period of maximum flow at 2 MGD lasts about one hour. For about 15 minutes of said hour, every day, the setting of the valves 26 is modified so that one of the filter sections 15, 16, 17, etc., receives sewage at a rate of about 1¾ MGD; that is, this particular section is then dosed with about 210 MGAD, while the remainder of ¼ MGD is distributed over the other nine sections, resulting in a temporary low dosage thereof at about 2¾ MGD. During these 15 minutes, the valve 32 of the filter operated at the high rate is closed and the valve 33 of that filter is open, so that the tank 34 is filled rapidly. Up to 23 hours is available after each filling operation, for sedimentation of sludge in tank 34. However, I prefer to empty the tank after a shorter period, in order to avoid septic conditions in the sludge.

A ten day cycle is provided, in which every filter section 15, 16, 17, etc., is once exposed to such a rinse. It has been previously ascertained that this cycle results in the desirable condition of the filter bed as above stated. This cycle, however, must be modified to some extent, during the season in which the discharge of bacterial film from the filter tends to be particularly plentiful. The approach of that season is determined by daily observation of the amount of sludge received in the tank 34. When this tends to increase, the control must be changed; the flushing operations must be made shorter, or spread over a different number of days, or adjusted in other suitable ways. Otherwise, excessive amounts of bacterial growth are discharged, and repeated starting and maturing of the filter becomes necessary, resulting in insufficient average performance.

With the controlled operation as proposed, the desirable reduction of BOD which results from flow rates such as 15 MGAD is made continuously available. In fact, the percentage of BOD reduction in some instances is slightly better than in standard low rate filters operated close to 5 MGAD. At the same time, a means has been provided whereby such desirable operation can be continued without ponding and breakdown of the filter, and without the expense for continuous high rate recirculation. The dimensions, flow rates and other specific data stated herein are, of course, subject to considerable variations. The filter may have other shapes than rectangular, and the sewage distributing means may be movable rather than fixed. The local standard flushing rate of 210 MGAD may be too high or too low for other localities, and a 15-minute application thereof every 10 days may be too little or too much, depending on the physical and other characteristics of the particular filter growth. Also, such a rate may be applied either uniformly or with variations in the momentary rates, for instance between 200 and 300 MGAD. Similarly, the normal rate of about 12 MGAD may be applied uniformly or with variations, for instance between 5 and 15 MGAD. The sewage applied may be municipal, industrial, or institutional. Various other modifications will occur to persons skilled in the art.

I claim:

1. Method of sewage treatment in a trickling filter, comprising the steps of normally maintaining biological growth in the filter, by dosage of sewage thereon, so as to retain the sewage in the growth for a period of about thirty to forty-five minutes, whereby the sewage is purified to a high degree while the growth tends to become more abundant and relatively more anaerobic and periodically reconditioning the growth by increased dosage of sewage thereon, sufficient to remove portions thereof, to control the tendency of the growth to become more abundant and relatively more anaerobic.

2. Method of sewage treatment in a trickling filter, comprising the steps of passing sewage through the filter, during extended periods of time, at such a rate as to retain the sewage in the biological growth of the filter for a period of about thirty to forty-five minutes, such rate generally being about 5 to 15 million gallons per acre per day, to promote the biological growth of the filter so as to create a tendency towards clogging of the filter; and periodically passing flows of sewage through the filter at a much more rapid rate, during short periods of time, prior to actual clogging of the filter, to rinse out portions of the biological growth and thereby to control said tendency towards clogging.

FRANK D. PRAGER.

REFERENCES CITED

The following references are of record in the file of this patent:

UNITED STATES PATENTS

| Number | Name | Date |
|---|---|---|
| 559,522 | Glover | May 5, 1896 |
| 603,221 | Miller | Apr. 26, 1898 |
| 651,835 | Deutsch | June 19, 1900 |
| 1,657,822 | Frechou | Jan. 31, 1928 |
| 2,073,441 | Blunk | Mar. 9, 1937 |
| 2,084,659 | Streander | June 22, 1937 |
| 2,090,405 | Shook | Aug. 17, 1937 |
| 2,097,779 | Shook | Nov. 2, 1937 |
| 2,141,979 | Halvorson et al. | Dec. 27, 1938 |
| 2,168,208 | Jenks | Aug. 1, 1939 |
| 2,220,859 | Bispham et al. | Nov. 5, 1940 |
| 2,242,652 | Maxwell | May 20, 1941 |
| 2,258,398 | Ward | Oct. 7, 1941 |
| 2,283,166 | Buell et al. | May 19, 1942 |
| 2,308,866 | Dekema | Jan. 19, 1943 |
| 2,317,782 | Levine | Apr. 27, 1943 |

FOREIGN PATENTS

| Number | Country | Date |
|---|---|---|
| 941 | Great Britain | 1899 |
| 3,395 | Great Britain | 1877 |
| 4,460 | Great Britain | 1899 |
| 8,088 | Great Britain | 1889 |
| 22,864 | Great Britain | 1909 |
| 405,197 | France | Nov. 9, 1909 |

OTHER REFERENCES

"American Sewerage Practice," Metcalf & Eddy, published in 1935 by McGraw-Hill Book Co., Inc., pp. 503 and 504 cited (vol. III).

"American Sewerage Practice," Metcalf & Eddy, published in 1935 by McGraw-Hill Book Co. Inc., N. Y., p. 482.

"Sewerage and Sewage Treatment by Babbitt, published in 1925 by John Wiley & Sons, Inc., N. Y., pp. 421–423 are cited.